US00RE46384E

(19) United States
(12) Reissued Patent
Johnson

(10) Patent Number: US RE46,384 E
(45) Date of Reissued Patent: May 2, 2017

(54) LASER LIGHTING APPARATUS WITH HEATSINK HOUSING

(71) Applicant: Bliss Holdings, LLC, Escondido, CA (US)

(72) Inventor: Randy Edward Johnson, Vista, CA (US)

(21) Appl. No.: 14/162,603

(22) Filed: Jan. 23, 2014

Related U.S. Patent Documents

Reissue of:
(64) Patent No.: 8,100,537
Issued: Jan. 24, 2012
Appl. No.: 12/353,948
Filed: Jan. 14, 2009

U.S. Applications:
(60) Provisional application No. 61/011,518, filed on Jan. 18, 2008.

(51) Int. Cl.

| | |
|---|---|
| ***G03B 21/16*** | (2006.01) |
| ***G03B 21/14*** | (2006.01) |
| ***G02B 26/08*** | (2006.01) |
| ***G03H 1/22*** | (2006.01) |
| ***F21V 21/08*** | (2006.01) |
| *F21V 21/30* | (2006.01) |
| *F21W 131/109* | (2006.01) |
| *F21Y 101/02* | (2006.01) |

(52) U.S. Cl.
CPC ..... *G02B 26/0808* (2013.01); *F21V 21/0824* (2013.01); *G03H 1/22* (2013.01); *F21V 21/30* (2013.01); *F21W 2131/109* (2013.01); *F21Y 2101/025* (2013.01); *G03H 2227/06* (2013.01)

(58) Field of Classification Search
CPC ..... F21Y 2101/02; F21Y 2101/025; F21V 21/0824; F21V 21/30; F21V 29/004; H01S 5/02212; G02B 26/0808; G03H 1/22; G03H 2227/06; F21W 2131/109
USPC .... 359/1, 15, 27; 372/34, 36, 29.01, 29.011, 372/29.012, 29.015, 29.014; 362/35, 84, 362/257, 259, 285, 287, 362, 368, 370, 362/371, 373; 353/22, 52, 100, 101, 119, 353/121
See application file for complete search history.

(56) References Cited

U.S. PATENT DOCUMENTS

| | | | | |
|---|---|---|---|---|
| 5,599,091 | A * | 2/1997 | Kira | 362/269 |
| 6,612,720 | B1 * | 9/2003 | Beadle | 362/287 |
| 6,814,470 | B2 * | 11/2004 | Rizkin et al. | 362/327 |
| 7,003,006 | B2 * | 2/2006 | You et al. | 372/36 |
| 7,157,664 | B2 * | 1/2007 | Best et al. | 219/209 |
| 7,462,983 | B2 * | 12/2008 | Baroky et al. | 313/503 |
| 2001/0014021 | A1 * | 8/2001 | Duff et al. | 362/268 |
| 2004/0114355 | A1 * | 6/2004 | Rizkin et al. | 362/153 |

(Continued)

FOREIGN PATENT DOCUMENTS

JP 63-303317 * 12/1988

*Primary Examiner* — Kenneth J Whittington

(57) ABSTRACT

A laser landscape lighting apparatus for use in accent lighting applications for landscapes and outdoor venues. In one embodiment, the laser landscape lighting apparatus includes a coherent light source in combination with a diffractive optical element and optionally a diffraction grating wheel. The diffractive optical element may be, for example, a holographic optical element. In some embodiments, the laser landscape lighting apparatus includes a temperature-controlled integral derivative system. In one application, the laser landscape lighting apparatus may project a static or movable star field.

5 Claims, 8 Drawing Sheets

(56) References Cited

U.S. PATENT DOCUMENTS

| | | | | |
|---|---|---|---|---|
| 2006/0092491 | A1* | 5/2006 | Wang | 359/196 |
| 2006/0098423 | A1* | 5/2006 | Dean et al. | 362/157 |
| 2006/0171441 | A1* | 8/2006 | Nakamura | 372/107 |
| 2008/0192467 | A1* | 8/2008 | Rizkin et al. | 362/245 |
| 2009/0180283 | A1* | 7/2009 | Chu | 362/259 |
| 2009/0303735 | A1* | 12/2009 | Chen | 362/373 |
| 2010/0118536 | A1* | 5/2010 | Johnson | 362/259 |

* cited by examiner

LASER LIGHTING APPARATUS WITH HEATSINK HOUSING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY UNDER 35 U.S.C. §119

This applications claims the benefit of U.S. Provisional Application No. 61/011,518 entitled "Laser Landscape Lighting Apparatus" filed Jan. 18, 2008.

FIELD OF INVENTION

Landscape and outdoor venue lighting.

BACKGROUND OF INVENTION

Lighting enhancement of trees, planting beds, buildings, signage, driveways, sidewalks, landscaped paths, and similar venues may be desired for its aesthetically pleasing decorative effects and visual interest as well as for seasonal accent. Examples of landscape lighting include lighting devices for spot or flood lighting. path lighting, deck and patio lighting and/or well lighting. Generally, landscape and architectural lighting products utilize conventional lighting technology such as incandescent, gas discharge and solid state lighting devices, e.g., light-emitting diodes (LEDs). More recently, some landscape and architectural lighting products use solar lighting technology.

SUMMARY OF INVENTION

A laser landscape lighting apparatus, comprising: (a) a housing; and (b) a lighting device within the housing, the lighting device comprising: (i) at least one coherent light source; (ii) at least one holographic optical element, the at least one holographic optical element positioned within a light pathway of the laser when power is supplied thereto; (iii) a switched-mode power supply to supply power to the coherent light source; and (iv) a temperature control proportional integral derivative system to allow the coherent light source to function at sub-zero Fahrenheit temperature conditions is herein disclosed. In one embodiment, the sub-zero conditions range from as low as 20 degrees Fahrenheit.

The laser landscape lighting apparatus may further include: (a) a heatsink housing the at least one coherent light source, the heatsink having an opening to allow light emanating from the coherent light source to project therethrough; and (b) a printed circuit board positioned adjacent to the heatsink, the printed circuit board having components to electrically connect the coherent light source to a power source. The laser landscape lighting apparatus may further include a snap ring positioned within a groove of a top surface of the heatsink, the snap ring having an opening therethrough, the holographic optical element affixed to a top surface of the snap ring. The laser landscape lighting apparatus may further include a first lens and a second lens, the first lens having an opening therethrough and affixed to the top surface of the heatsink, the second lens affixed to a bottom surface of the heatsink wherein a circumference of the first lens is smaller than an inner luminal surface of the housing.

In one embodiment, the housing includes a rotatable knuckle attached to a distal end of the housing, the rotatable knuckle comprising a first knuckle component and a second knuckle component wherein the first knuckle component and the second knuckle component are coupled together by a key. The rotatable knuckle may allow the housing to span within a 180 degree range.

In one embodiment, the housing is approximately cylindrical and a proximal end of the housing is angled. The housing may further include an exterior lens affixed within the inner luminal surface of the housing by a silicone gasket. In one embodiment, the coherent light source is a diode pumped solid state laser.

In an alternative embodiment, the laser landscape lighting apparatus may further include a diffractive grating wheel positioned in front of the holographic optical element. The laser landscape lighting apparatus may further include a fractional rotational motor wherein the diffractive grating wheel is affixed to a stem of the fractional rotational motor. The laser landscape lighting apparatus may further include (a) a heatsink positioned on a blanket adjacent an inner bottom surface of the housing; and (b) a printed circuit board positioned adjacent to the heatsink on the blanket, the printed circuit board having components to electrically connect the coherent light source to a power source.

In the alternative embodiment, the housing may be approximately cuboidal and may include a protective cover, the protective cover providing an angled covering over a proximal end of the housing. The laser landscape lighting apparatus may further include an exterior lens affixed within an inner surface of the proximal end of the housing by a silicone gasket.

In any embodiment, the at least one coherent light source and the at least one holographic optical element generate a star field when supplied with power from the power supply. In an alternative embodiment, the at least one coherent light source, the at least one holographic optical element, the diffractive grating wheel and the at least one motor generate a moving star field when supplied with power from the power supply.

A method of creating a star field, comprising: (a) causing light from a coherent light source to pass through at least one holographic optical element wherein the at least one coherent light source is positioned to direct light through the at least one holographic optical element when power is supplied thereto; and (b) causing the coherent light source to function at sub-zero Fahrenheit temperature conditions is herein disclosed. The method may further include: (a) causing light from the coherent light source to pass through a diffractive grating wheel; and (b) causing the grating wheel to rotate, wherein rotation is effectuated by a first motor attached to the grating wheel. The method may further include allowing a housing having the coherent light source and the holographic optical element therein to span within a 180 degree range.

DETAILED DESCRIPTION

The following detailed description is of the best currently contemplated modes of carrying out the invention. The description is not to be taken in a limiting sense, but is made merely for the purpose of illustrating the general principles of the invention.

Embodiments of the invention are directed to a laser landscape lighting apparatus for use in accent lighting applications for landscapes and outdoor venues. In one embodiment, the laser landscape lighting apparatus includes a coherent light source in combination with a diffractive optical element and optionally a diffraction grating wheel. The diffractive optical element may be, for example, a holographic optical element. In some embodiments, the laser landscape lighting apparatus includes a temperature-controlled integral derivative system. In one application, the laser landscape lighting apparatus may project a static or movable star field.

A diffractive optical element (DOE) is a class of optics that operates on the principle of diffraction. Traditional optical elements use their shape to bend light. By contrast, diffractive optics break apart incoming waves of light into a large number of waves which then recombine to form completely new waves. DOEs can function as grating, lenses, aspheric or any other type of optical element. They offer unique optical properties that are not possible with conventional optical elements. In addition, DOEs can be fabricated in a wide range of materials including, but not limited to, aluminum, silicon, silica or plastic.

Figure 1:
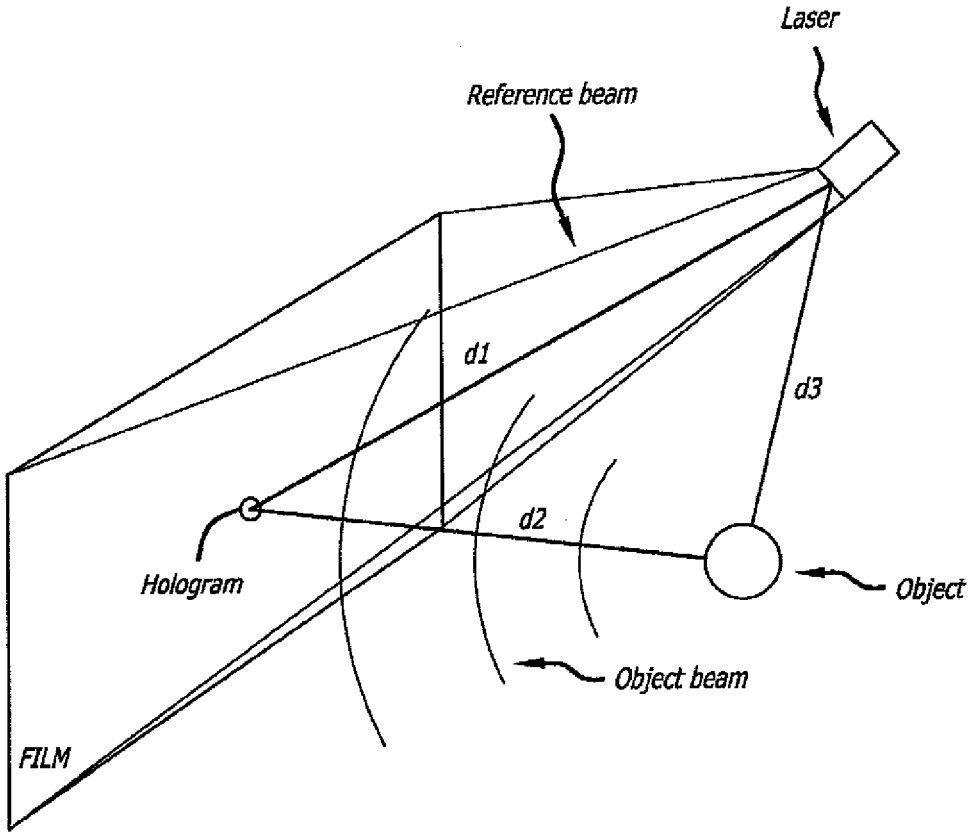
FIG. 1 illustrates an optical path set-up to produce a hologram.

Holography is a technique that allows the light scattered from an object to be recorded and later reconstructed so that it appears as if the object is in the same position relative to the recording medium as it was when recorded. The image changes as the position and orientation of the viewing system changes in exactly the same way is if the object were still present, thus making the recorded image, termed a hologram, appear three-dimensional. FIG. 1 illustrates an optical path set-up to produce a hologram.

A hologram can be produced from laser-light beams being scattered off of an object and interfered with by a reference beam. A two-dimensional recording medium, such as a photosensitive plate or holographic film, records three-dimensional volumetric phase information of an object which is termed a fringe or iterative Fourier transfer algorithm (IFTA) pattern. This procedure is similar to photography where white light scattered front photographed objects is recorded on silver halide film. Light has a phase (volume) and amplitude (intensity) but only intensity is recorded in conventional photography. A hologram, however, stores both amplitude and phase due to the interference of the reference beam. This reference beam possesses the same characteristics as scattered light because of the action of the laser. The phase information is the most important factor in holography because it provides the depth cues to the eyes and allows for an image to appear in three dimensions.

In the computer science field, a computer-generated holographic image is computed by numerically simulating the physical phenomena of light diffraction and interference. It is possible for computer software to calculate the phase of light reflected or transmitted from or through an object. Computing the phase of light of different objects, such as points, lines and wire frames, produces an interferential simulation that may in turn by transferred to a photographically sensitive media.

A holographic optical element (HOE) is a type of DOE. A holographic optical element is a hologram of a point source and acts as a lens or a mirror having optical power, i.e., the ability to focus light. The hologram consists of a diffraction pattern rendered as a surface relief which may be, for example, a thin film (created using photoresist and/or dichromated gelatin) containing an index modulation throughout the thickness of the film. "Index modulation" refers to a periodic feature set that has a linear distribution of patterns to produce novel optical effects created during the process of making the HOE. Either process (dichromated gelatin or photoresist) can be used to create a mathematical distribution to create a linear derivative producing a periodic feature set implemented into a phase mask. In one embodiment of the invention, a non-linear implementation of IFTA produces a logarithmic or otherwise hyperbolic IFPTA wave function that may be used to produce non-linear phase derivatives onto a diffractive surface. According to embodiments of the invention, holograms can be classified into two categories: (i) "reflection holograms" in which incidence and diffracted light are on the same side of the HOE; and (ii) "transmission holograms" in which incident and diffracted light are on opposite sides.

Figure 2A:
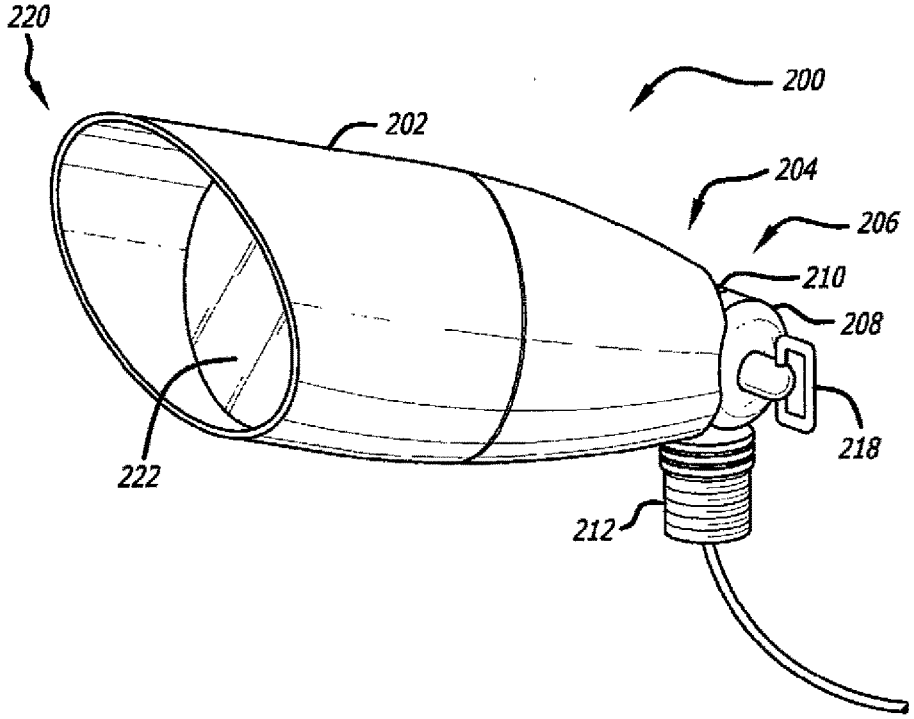
FIG. 2A illustrates a perspective view of a laser landscape lighting apparatus according to an embodiment of the invention.
Figure 2A:
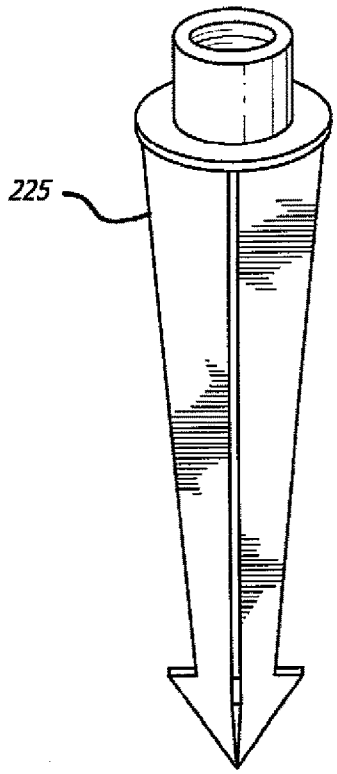

FIG. 2A illustrates a perspective view of a laser landscape lighting apparatus according to an embodiment of the invention. Laser landscape lighting apparatus 200 includes a housing 202 which may house a lighting device (not shown, see FIGS. 3A-3B). Housing 202 may be comprised of brass, stainless steel or any other suitable material. In any case, housing 202 should be substantially or completely weather-resistant and/or should be capable of protecting components within housing 202 from adverse weather conditions. Housing 202 may be comprised of two components which may releasably couple together by friction-, press- or screw-fitting. Housing 202 is substantially hollow within.

At a distal end 204 of housing 202, a rotatable knuckle 206 may be attached thereto. Rotatable knuckle 206 may be comprised of a first knuckle component 208 with teeth around an inner periphery thereto and a second knuckle component 210 also with teeth around an inner periphery thereto. Second knuckle component 210 may include a cylindrical threaded shaft 212 for coupling to a stake (explained in more detail below). First knuckle component 208 may be integral with the distal end 204 of housing 202 while second component 210 may be releasably attached to first component 208. First knuckle component 208 may include an aperture 214 therethrough while second knuckle component 210 may include a receiving groove 216 (not shown) in line with aperture 214. A threaded key 218 may releasably connects first knuckle component 208 and second knuckle component 210 via aperture 214 and receiving groove 216. Threaded key 218 may be turned clockwise or counter-clockwise to position housing 202 about a range of approximately 180°; however, it should be appreciated that, in some embodiments, housing 202 may be positioned in any direction by including a rotatable shroud such as those known by one of ordinary skill in the art.

Figure 2B:
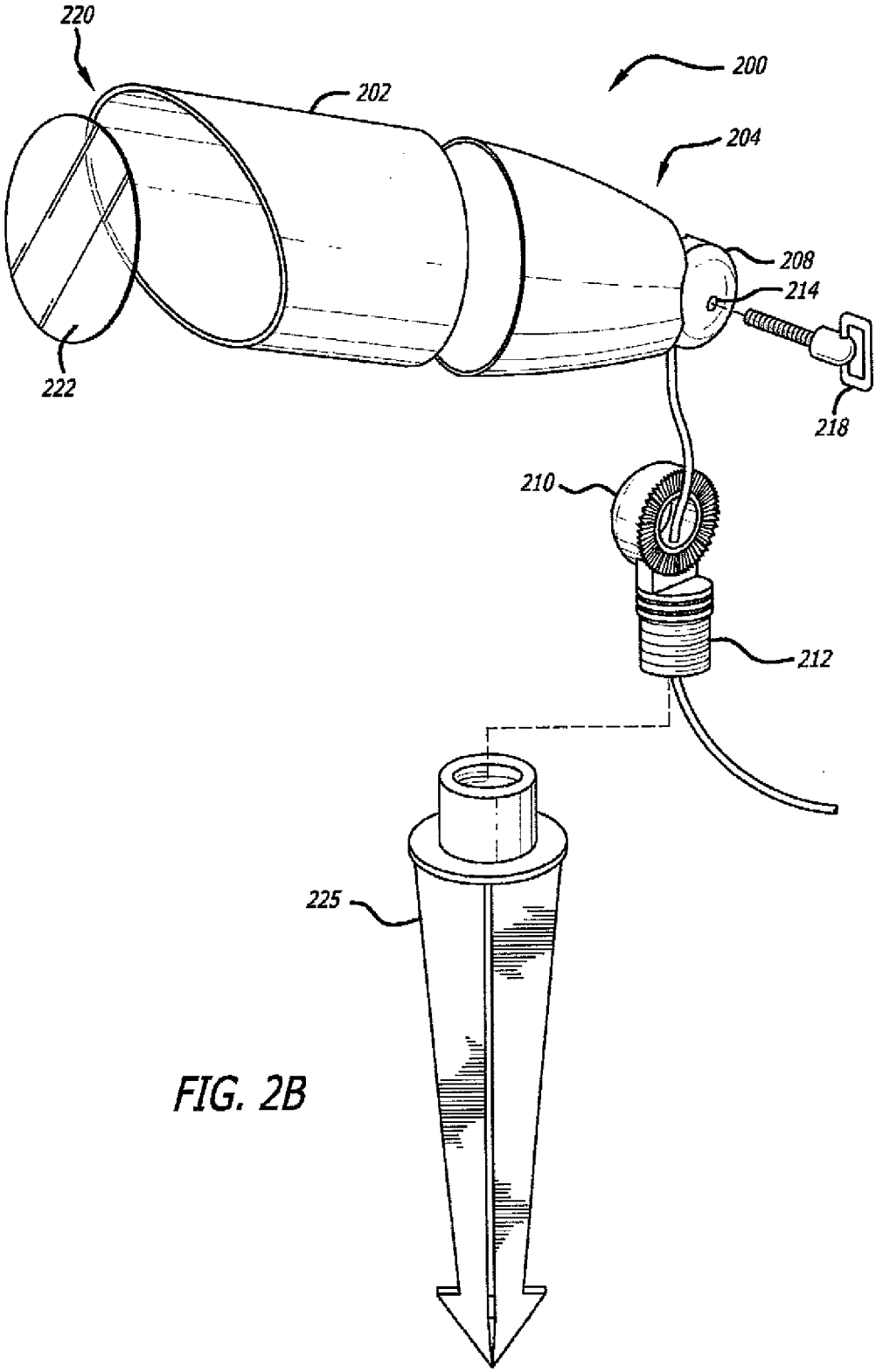
FIG. 2B illustrates an exploded view of laser landscape lighting apparatus of FIG. 1.

A proximal end 220 of housing 202 may be substantially angled and include an exterior lens 222 positioned within an inner luminal surface of housing 202. This configuration is for projection purposes as well as for protection of exterior lens 222 to adverse weather conditions. Exterior lens 222 may be comprised of clear, tempered and/or heat-resistant glass with silicone attaching it to the inner surface of housing 202, i.e., a silicon gasket. In some embodiments, a lawn stake 225 with external threads may threadedly engage with cylindrical threaded shaft 212. In this manner, laser landscape lighting apparatus 200 may be staked in a lawn or other suitable medium for an outdoor projection of a stationary or movable star field (explained in more detail below). FIG. 2B illustrates an exploded view of laser landscape lighting apparatus 200.

Figure 3A:
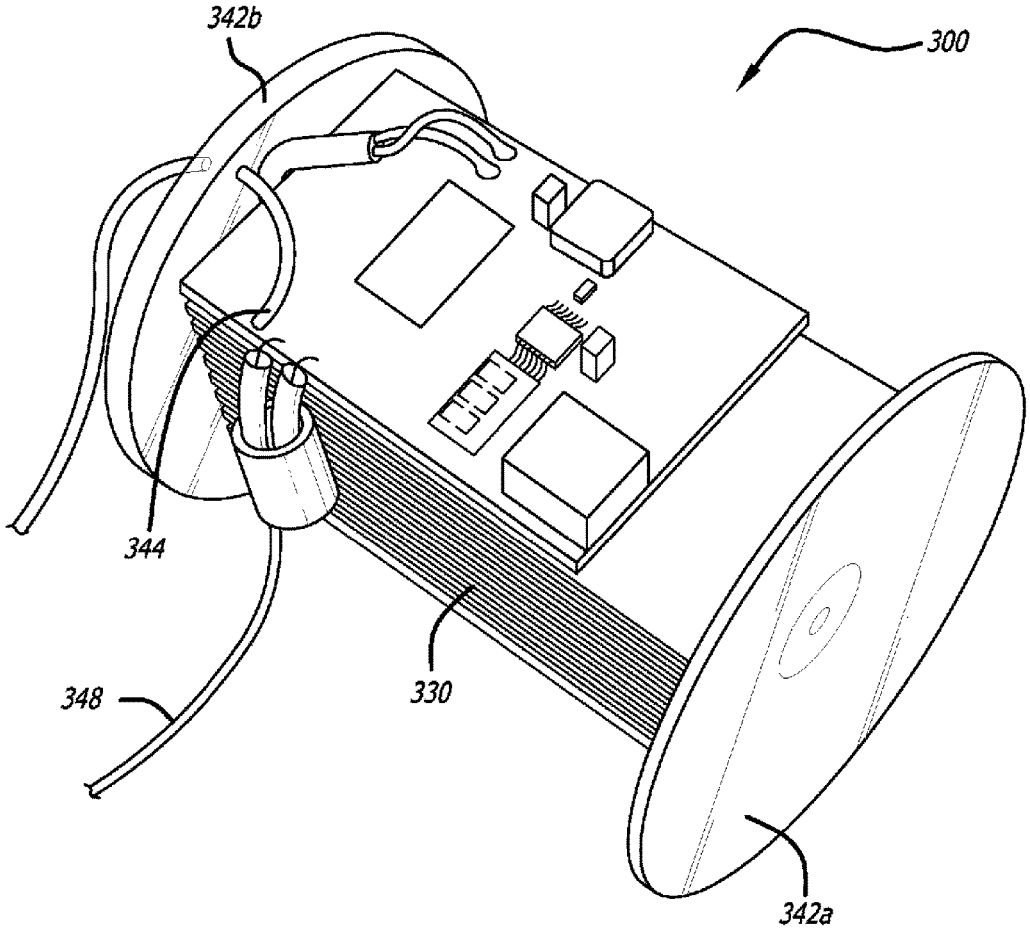
FIG. 3 illustrates an exploded view of lighting device which may be housed within a laser landscape lighting apparatus according to an embodiment of the invention.
Figure 3B:
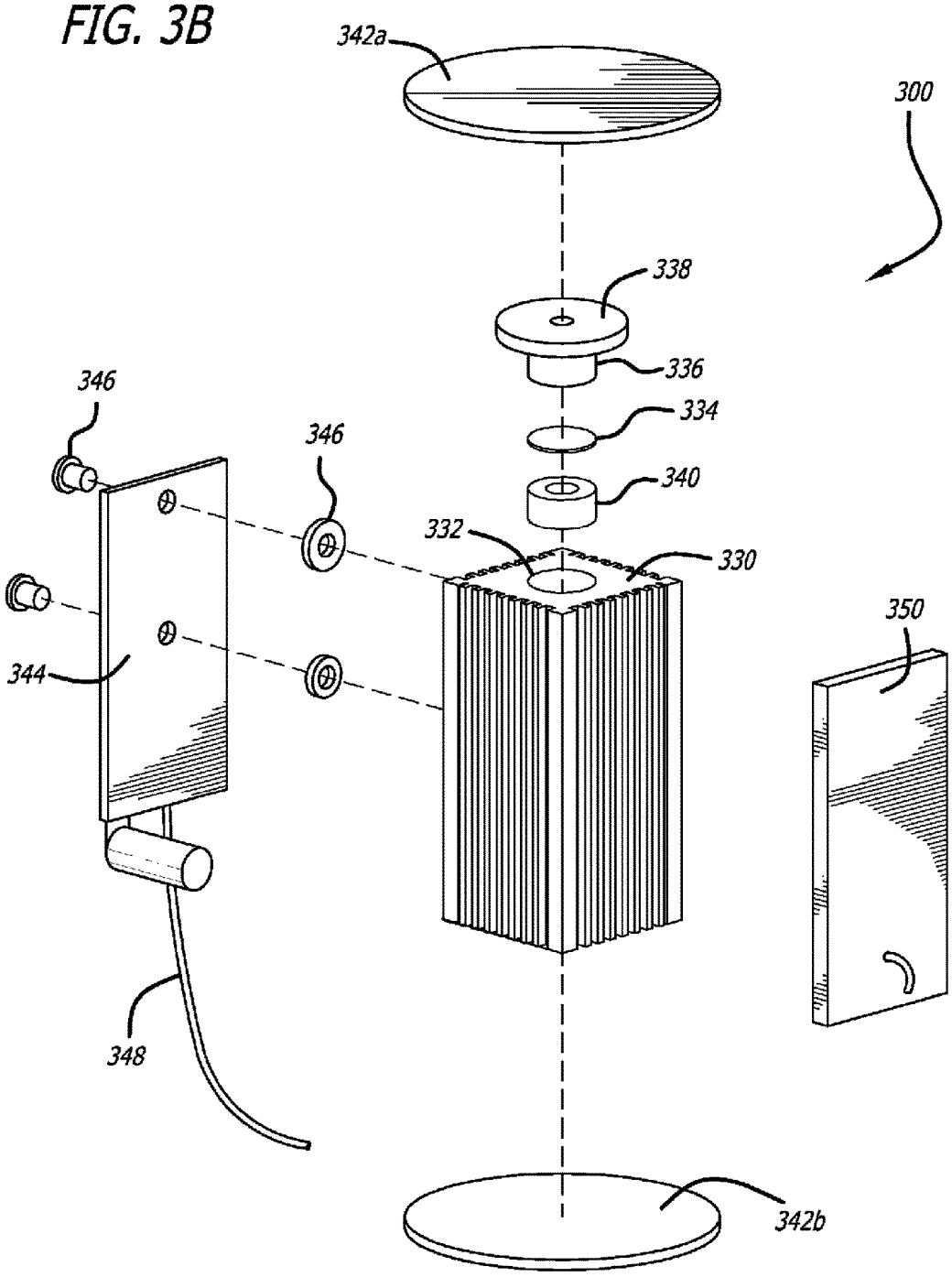

FIGS. 3A-3B illustrate a perspective view and an exploded view, respectively, of a lighting device which may be housed within a laser landscape lighting apparatus according to an embodiment of the invention. Lighting device 300 may include a laser 328 (not shown) situated within a heatsink 330 to absorb and dissipate heat emanating from laser 328 when power is supplied thereto. In some embodiments, heatsink 330 is approximately rectangular in configuration; however, other geometric shapes are within the scope of the invention. Heatsink 330 may be made of a metal material and may have a plurality of fins to expand the surface area for increased heat dissipation. Heatsink 330 includes an opening 332 (see FIG. 3B) through which light emanating from laser 328 is projected therethrough. Laser 328 may be positioned to direct its light source through a holographic optical element 334 (see FIG. 3B). In an alternative embodiment, HOE 334 may be embossed and integrated into the collimation optics of laser 328. HOE 334 may be stationary or attached to a movable component (explained in more detail below).

In some embodiments, the laser of lighting device 300 is a diode pumped solid state (DPSS) laser. A DPSS laser is a device that converts some form of energy (e.g., electrical, optical, chemical) into a narrow beam of light which is monochromatic, directional and coherent. "Monochromatic" means pertaining to light of one color or to radiation of a single wavelength or narrow range of wavelengths. "Directional" means that the beam of light is very well columnated and travels over long distances with very little spread in diameter. "Coherent" means of or pertaining to waves that maintain a fixed phase relationship. The effect of one wave enhances the strength of every other wave so that the overall effect of coherent light is much greater than if the waves were not in phase. In one embodiment, the DPSS laser may be an FLPPS Class IIIa single beam laser with a total laser power of less than five (5) milliWatts. The DPSS laser may have a wavelength of approximately five hundred and thirty-two (532) nanometers (nm). In other embodiments, the laser of lighting device 300 is a direct diode laser light source wherein the laser light is produced from a solid state diode directly rather that a multiple optical crystal laser as in a DPSS type. The direct diode laser may have a wavelength of between six hundred and fifty (650) and six hundred and seventy (670) nm.

To fix HOE 334 within the light path of laser 328 (when power is supplied thereto), HOE 334 may be positioned within a stem 336 of a snap ring 338 with a snap ring retainer 340 positioned adjacent a bottom surface of HOE 334 and also within stem 336. In one embodiment, snap ring 338, HOE 334 and snap ring retainer 340 are all cylindrical or circular in configuration. Moreover, at least snap ring 338 and snap ring retainer 340 include an opening through their centers through which light emanating from laser 328 is projected therethrough. This feature allows the light emanating from laser 328 to pass through HOE 334 without interference from these supporting components, i.e., snap ring 338 and snap ring holder 340. Also, in one embodiment, stern 336 of snap ring 338 may be internally threaded while snap ring retainer 340 may be externally threaded. As a result, snap ring holder 340 may threadedly engage with stem 336 of snap ring 338 with HOE 334 situated therein. The resultant combination may be fitted within opening 332 of heatsink 330.

In another embodiment, the HOE 334 (or a plurality of HOEs 334) may be affixed directly to an outside surface of snap ring 338 by an adhesive. A protective cover lens may be secured over the HOE 334 according to some embodiments. In this embodiment, snap ring 338 may be cylindrical or circular in configuration and may threadedly engage with an opening on a top surface of heat sink 330. Moreover, snap ring 338 may include an opening through its center through which light emanating front laser 328 is projected therethrough. HOE 334 (or a plurality of HOEs 334) may be square, circular, triangular or any other suitable geometric configuration. In some embodiments, transparent or substantially transparent lenses 342a and 342b are affixed to top and bottom surfaces of heatsink 330, respectively. Lenses 342a, 342b may be affixed by an adhesive, screws or any other suitable affixing mechanism known by one of ordinary skill in the art. In one embodiment, lens 342a has an opening therethrough wherein the circumference defining the opening substantially corresponds to an outer circumference of snap ring 338. Additionally, an outer circumference of at least lens 342a may substantially correspond to an inner luminal circumference of the housing (such as housing 200). In this manner, lenses 342a, 342b function to protect components of lighting device 300 and/or to fixedly position lighting device 300 within a housing of a laser landscape lighting apparatus (such as housing 200).

To electrically connect laser 328 to an outside power source (and also provide other functional aspects), a printed circuit board (PCB) 344 having a switched-mode power supply (individual components not shown) may be affixed to an outer surface of heatsink 330 and may include connecting components to electrically connect to laser 328 therewithin. A non-switching type of power supply may be utilized to provide the necessary drive voltage and current. In this case, a linear power supply may be used. PCB 344 may be affixed by screws and washers 346 or equivalent affixing mechanism known by one of ordinary skill in the art. A distal end of a wire 348 may be electrically connected to PCB 344 while a proximal end of wire 348 (not shown) may be adapted to electrically connect to a outside power source (not shown) via an AC adaptor. In one embodiment, a blanket 350 may be positioned on an opposite side of heatsink 330 relative to PCB 344.

A switched-mode power supply (SMPS) is an electronic power supply unit (PSU) that incorporates a switching regulator. The SMPS rapidly switches a power transistor between saturation (full on) and cutoff (completely off) with a variable duty cycle whose average is the desired output voltage. The resulting rectangular waveform is low-pass filtered with an inductor and capacitor. The main advantage of this method is greater efficiency because the switching transistor dissipates little power in the saturated state and the off state compared to the semiconducting state (active region). Other advantages include smaller size and lighter weight (from the elimination of low frequency transformers which have a high weight) and lower heat generation from the higher efficiency. In this regard, lighting device 300 exhibits higher efficiency and improved performed over other types of accent lighting.

Figure 4A:
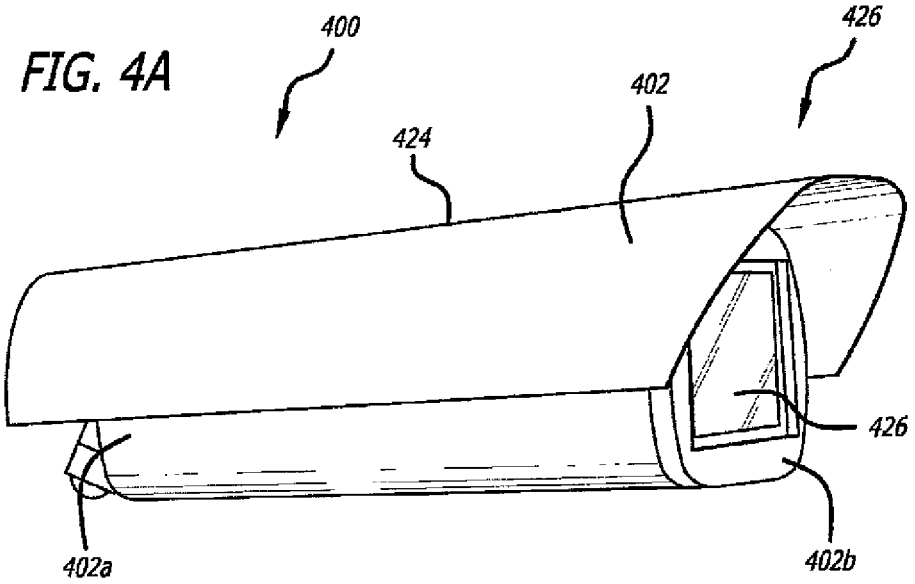
FIG. 4A illustrates a front perspective view of a laser landscape lighting apparatus according to an alternative embodiment of the invention.
Figure 4B:
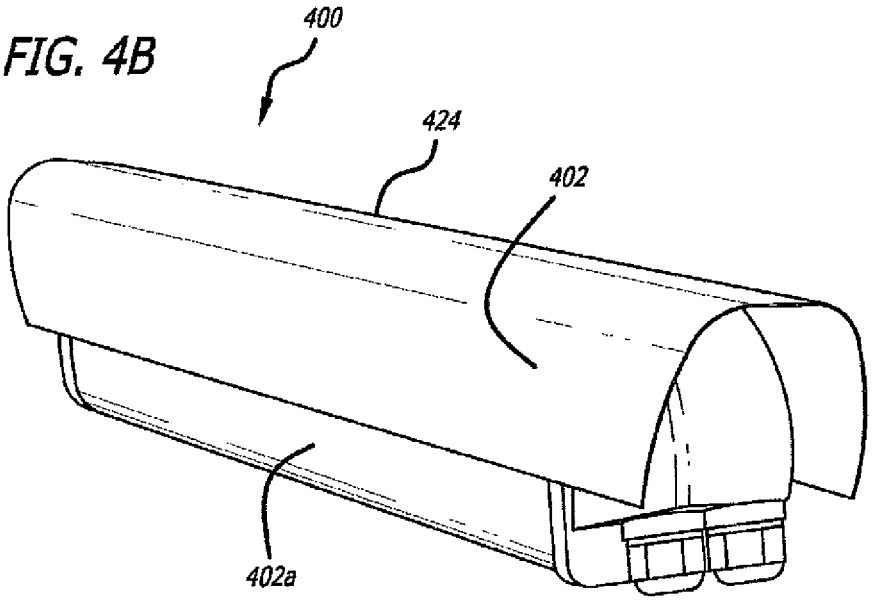
FIG. 4B illustrates a back perspective view of a laser landscape lighting apparatus of FIG. 4A.

FIGS. 4A-4B illustrate perspective front and back views of a laser landscape lighting apparatus according to an alternative embodiment of the invention. Laser landscape lighting apparatus 400 includes a housing 402 which may house a lighting device (not shown, see FIG. 4C). Housing 402 may be comprised of brass, stainless steel or any other suitable material. Similar to the laser landscape lighting apparatus 200 illustrated in FIGS. 2A-2B, housing 402 should be substantially or completely weather-resistant and/or should be capable of protecting components within housing 402 from adverse weather conditions. Housing 402 may be comprised of two components which may releasably couple together by friction-, press- or screw-fitting, i.e., a body 402a and a front component 402b. In one embodiment, housing 400 is approximately cuboidal in configuration and includes a protective cover 424. A proximal end 426 of protective cover 424 may angle for similar reasons as those articulated with respect to FIGS. 2A-2B. Laser landscape lighting apparatus 400 may optionally include a mounting device (not shown).

Figure 4C:
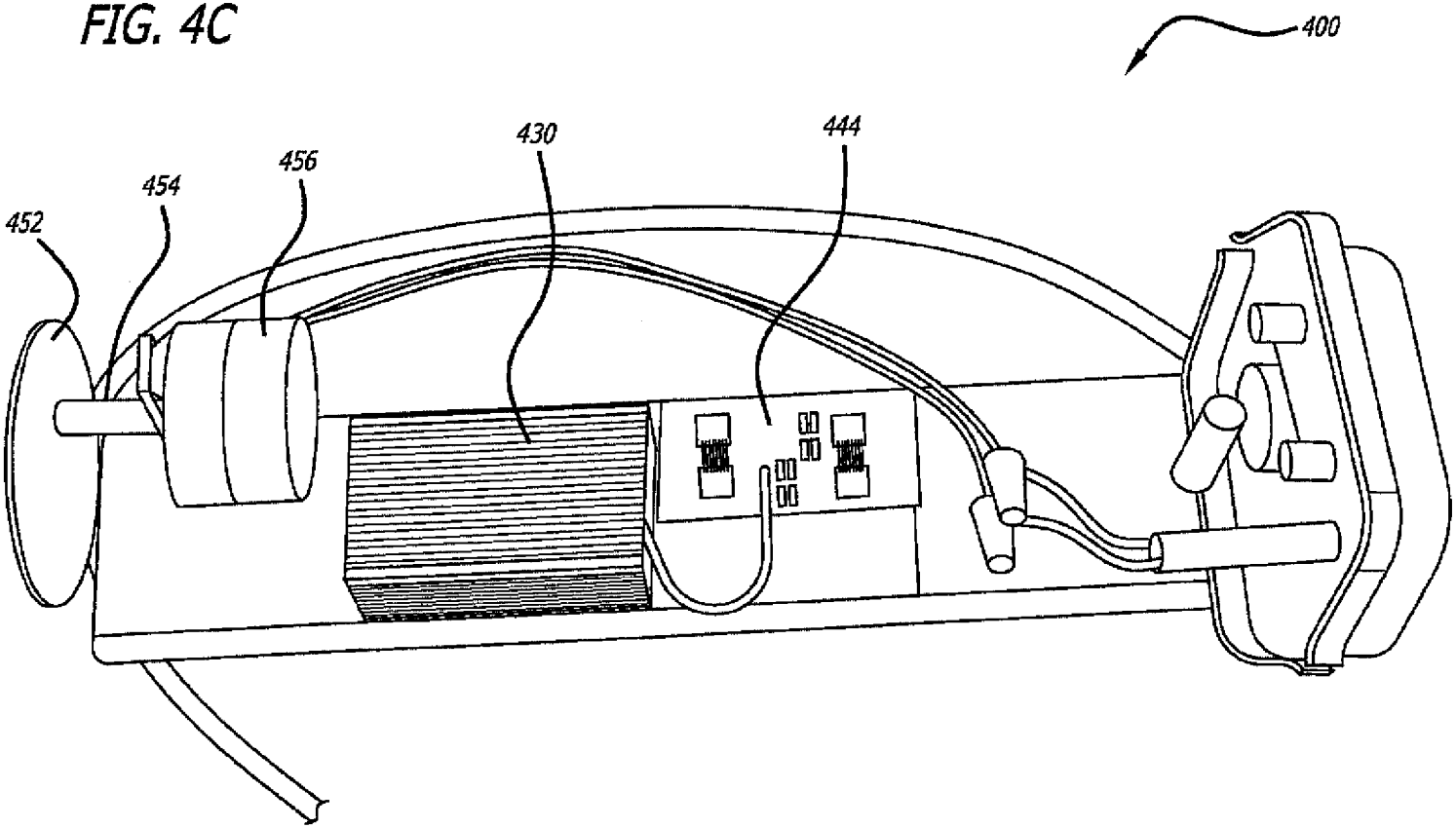
FIG. 4C is a perspective view of the inner components of the laser landscape lighting apparatus of FIGS. 4A-4B.

FIG. 4C is a perspective view of the inner components of the laser landscape lighting apparatus 400 of FIGS. 4A-4B. As shown, laser landscape lighting apparatus 400 includes a diffraction grating wheel 452 attached to a movable component, i.e., attached to a stem 454 of a rotatable fractional motor 456 (explained in more detail below); however, it should be understood that a diffraction grating wheel may be stationary in other embodiments, i.e., not attached to a motor. Motor 456 may be a fractional rotation motor of a synchronous or DC type. In one embodiment, motor 456 rotates at approximately ⅕ RPM. Motor 456 may be electrically or wirelessly connected to a motor current control which in turn is electrically or wirelessly connected to a principle power supply. As with the embodiments shown in FIGS. 3A-3B, the laser landscape lighting apparatus 400 includes at least a PCB 444 and a 430; however, in this embodiment, these (and other) components are affixed to supporting surface. One or more HOEs may be positioned behind diffraction grating wheel 452. Also, one or more lasers (such as those described previously) may be positioned behind the one or more HOEs. The lasers may be electrically or wirelessly connected to one or more power supplies, and, in turn, electrically or wirelessly connected to principle power supply. According to this configuration, diffraction grating wheel 452 may function to produce a secondarily coupled multiphase or spatial frequency phase modulus which provides an animation artifact of the resultant output of the laser, e.g., a moving "star field". It should be appreciated that the one or more HOEs can be connected to a motor in a similar manner as that of the diffraction grating wheel 452.

Figure 5:
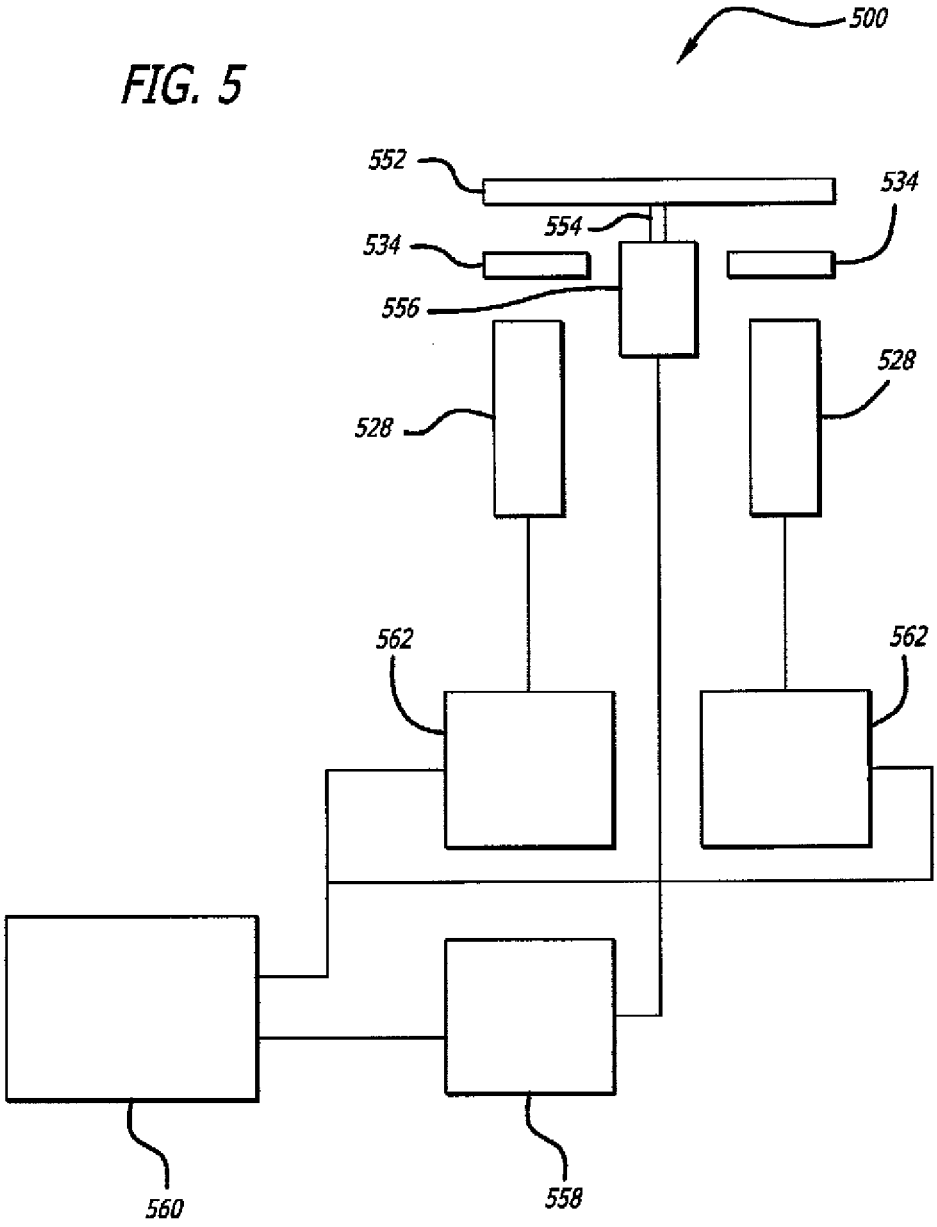
FIG. 5 is a block diagram of the functional components of a laser landscape lighting apparatus according to an embodiment of the invention.

FIG. 5 is a block diagram of the functional components of a laser landscape lighting apparatus 500 according to an embodiment of the invention. The diffraction grating wheel may be stationary or attached to a movable component. In this embodiment, a diffraction grating wheel 552 is connected to a movable component, i.e., a shaft 554 of a motor 556. Motor 556 may be a fractional rotation motor of a synchronous or DC type. In one embodiment, motor 556 rotates at approximately ⅕ RPM. Motor 556 may be electrically or wirelessly connected to a motor current control 558 which in turn is electrically or wirelessly connected to a principle power supply 560. One or more HOEs 534 may be positioned behind diffraction grating wheel 552. Also, one or more lasers 528 (such as those described previously) may be positioned behind the one or more HOEs 534. Lasers 528 may be electrically or wirelessly connected to one or more power supplies 562, and, in turn, electrically or wirelessly connected to principle power supply 560. According to this configuration, diffraction grating wheel 552 may function to produce a secondarily coupled multiphase or spatial frequency phase modulus which provides an animation artifact of the resultant output of the laser, e.g., a moving "star field". It should be appreciated that the one or more HOEs can be connected to a motor in a similar manner as that of the diffraction grating wheel 552.

In some embodiments, a proportional temperature control system, i.e., "temperature controller system" may be incorporated within the laser landscape lighting apparatus as described previously. The temperature controller system establishes the ideal thermal set point condition of between sixty-five (65) degrees Fahrenheit to about ninety-six (96) degrees Fahrenheit for the laser radiation source device, i.e., laser to optimally function independently from a wide range of external environmental temperatures, typically from about minus twenty-five (25) degrees Fahrenheit to about one hundred (100) degrees Fahrenheit. The temperature controller system is comprised of an electronically active or passive temperature sensor which is in intimate mechanical contact with the laser radiation source device providing a real time data stream or proportional current or voltage which may be directly translated into the absolute temperature of the laser radiation source device. The data, voltage or current is inputted into an electronic digital or analog functional circuit which proportionally provides a digital PWM, bipolar voltage or current to a voltage or current amplifier which supplies the necessary bipolar pulse-width modulation (PWM), voltage or current drive to either a resistive heating element or a Peltier junction device otherwise known as a TEC (Thermal Electronic Cooler). A closed loop is established between the absolute temperature of the laser radiation source device and the TEC or resistive heater element in order establish a predetermined set point temperature value of the laser radiation source device.

According to embodiments of the invention, when power is supplied to the laser landscape lighting apparatus light apparatus according to embodiments of the invention, the laser landscape lighting apparatus may project a static or movable (i.e., animated) star field. The stars may be any color, however, in a preferred embodiment, the stars of the star field are green or red.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art.

What is claimed is:

1. A laser lighting apparatus comprising: a [heatsink housing having an opening to allow light emanating from a coherent light source to project therethrough] *housing*; a lighting device within the housing, the lighting device comprising [at least one] *a single* coherent light source; *a heatsink housing the single coherent light source, the heatsink having an opening to allow light emanating from the single coherent light source to project therethrough;* at least one holographic optical element, the at least one holographic optical element positioned within a light pathway of the *single* coherent light source when power is supplied thereto; a switched-mode power supply to supply power to the *single* coherent light source; and a proportional temperature control system to allow the coherent light source to function at sub-zero Fahrenheit temperature conditions; a printed circuit board positioned [adjacent to the heatsink] *affixed to a supporting surface*, the printed circuit board having components to electrically connect the coherent light source to the power supply; and, a first lens and a second lens, the first lens having an opening therethrough and affixed to the top surface of the heatsink, the second lens affixed to a bottom surface of the heatsink wherein a circumference of the first lens is smaller than an inner luminal surface of the housing.

2. The laser lighting apparatus of claim 1 wherein the housing includes a rotatable knuckle attached to a distal end of the housing, the rotatable knuckle comprising a first knuckle component and a second knuckle component wherein the first knuckle component and the second knuckle component are coupled together by a key.

3. The laser lighting apparatus of claim 2 wherein the rotatable knuckle allows the housing to span within a 180 degree range.

4. The laser lighting apparatus of claim 3 wherein the housing is approximately cylindrical and wherein a proximal end of the housing is angled.

5. The laser lighting apparatus of claim 4 further comprising, an exterior lens affixed within the inner luminal surface of the housing by a silicone gasket.

* * * * *